S. Drum,
Sash-Cord Guide.
N° 64,957.   Patented May 21, 1867.
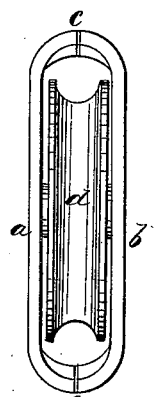
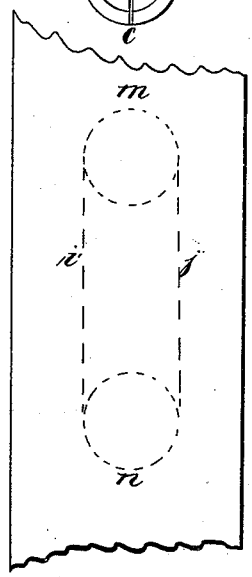
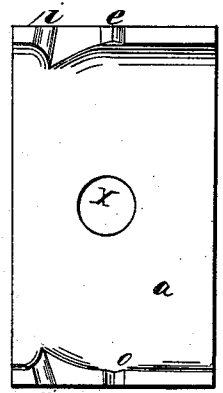
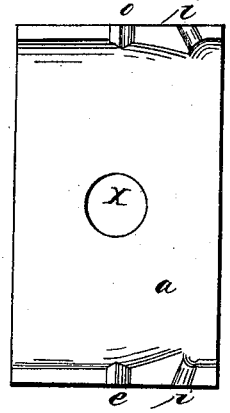
Witnesses:
James J. Johnston
Alexander Hays
Inventor:
Simon Drum

United States Patent Office.

SIMON DRUM, OF ALLEGHENY CITY, PENNSYLVANIA.

Letters Patent No. 64,957, dated May 21, 1867.

IMPROVEMENT IN SASH-PULLEYS.

*The Schedule referred to in these Letters Patent and making part of the same.*

TO ALL WHOM IT MAY CONCERN:

Be it known that I, SIMON DRUM, of the city and county of Allegheny, and State of Pennsylvania, have invented a certain new and useful improvement in Sash-Pulleys; and I do hereby declare that the following is a full and exact description thereof, reference being had to the accompanying drawings and to the letters of reference marked thereon.

The nature of my invention consists in making a new article of manufacture, to wit, a sash-pulley, consisting of two side pieces and a pulley or sheave, constructed, arranged, and operating in the manner hereinafter described To enable others skilled in the art to make and use my invention, I will proceed to describe its construction and operation.

In the accompanying drawings—

Figure 1 represents a front elevation of my improved pulley with the several parts in juxtaposition.

Figure 2 represents an end view of the same.

Figures 3 and 4 represent an inside view of the sides.

Figure 5 represents a plan for making the mortise in the frame for the pulley and sides.

In the drawings $a$ and $b$ represent the sides, the ends of which are furnished with notches marked $o$, and projecting points marked $e$; these notches and projections act as dove-tails for holding the two sides in proper relation to each other; $x$ represents openings in the sides for the journals or axis of the pulley or sheave $d$; $i$ represents the screw-holes which are used for securing the pulley and sides in the sash-frame. One-half of each of the screw-holes are made in each of the sides $a$ and $b$.

The mode of inserting the pulley and its sides in the sash-frame is as follows: I take a centre-bit, the size of which corresponds to the arch of the ends of the sides $a$ and $b$, when joined together as indicated by the letter $c$, and with this centre-bit I bore two holes as indicated by the dotted lines $m$ and $n$, in fig. 5. I then cut out the space between the holes $m$ and $n$, as indicated by the two lines marked $i$ and $j$; I then put together the sides $a$ and $b$ and the pulley or sheave $d$, in the manner represented in figs. 1 and 2, and insert it in the recess mortised out in sash-frame, and secure it to its place by means of screws placed in the screw-holes marked $i$.

The advantages of my improvement in sash-pulleys consist, first, in simplicity of construction, and the ease, facility afforded in casting; second, saving time and labor in fitting the pulley in the sash-frames.

Having thus described the nature, construction, and operation of my improvement, what I claim as of my invention, is—

A shell for a sash-pulley, said shell being made in halves and without a face-piece, and so arranged that the openings for the screws are divided by the line of separation between the halves of said shell, whereby one half of each opening for the screws are cast in the ends of each half of the shell; the whole being constructed, arranged, and operating substantially as herein described, and for the purpose set forth.

SIMON DRUM.

Witnesses:
JAMES J. JOHNSTON,
ALEXANDER HAYS.